United States Patent
Kelly et al.

(10) Patent No.: US 6,397,620 B1
(45) Date of Patent: Jun. 4, 2002

(54) ULTRA-LOW TEMPERATURE FREEZER CABINET UTILIZING VACUUM INSULATED PANELS

(75) Inventors: Allan D. Kelly; Paul Steinhoff, both of Asheville, NC (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/707,226

(22) Filed: Nov. 6, 2000

(51) Int. Cl.[7] .......................... F25D 21/06; F25D 11/00
(52) U.S. Cl. ........................................ 62/275; 62/440
(58) Field of Search ........................... 62/272, 275, 440

(56) References Cited

U.S. PATENT DOCUMENTS

| | | | | | |
|---|---|---|---|---|---|
| 3,813,896 A | * | 6/1974 | Lebahn | .................. | 62/409 |
| 3,826,106 A | * | 7/1974 | O'Hanlon et al. | .............. | 62/275 |
| 3,916,643 A | * | 11/1975 | Brown | ..................... | 62/410 |
| 3,952,542 A | * | 4/1976 | Berkowitz | ................ | 62/409 |
| 5,512,345 A | * | 4/1996 | Tsutsumi et al. | ............. | 428/69 |
| 5,600,966 A | * | 2/1997 | Valence et al. | .............. | 62/440 |
| 5,632,543 A | * | 5/1997 | McGrath et al. | ............ | 312/406 |
| 5,836,170 A | * | 11/1998 | Perkins et al. | ................ | 62/409 |
| 5,875,599 A | * | 3/1999 | McGrath et al. | ............ | 52/586.2 |
| 6,128,914 A | * | 10/2000 | Tamaoki et al. | ............... | 62/440 |
| 6,224,179 B1 | * | 5/2001 | Wenning et al. | ............ | 312/406 |

FOREIGN PATENT DOCUMENTS

EP         0911591 A1      4/1998

* cited by examiner

Primary Examiner—William C. Doerrler
(74) Attorney, Agent, or Firm—Baker & Hostetler LLP

(57) ABSTRACT

An ultra-low temperature refrigeration system (10) comprising a housing (12) and a door (14) which together define an interior storage compartment (16). The system (10) uses multiple layers (20,22) of varying insulative materials to insulate the housing (12), including conventional foam (20) and vacuum insulation panels (22), to balance cost, size, and capacity considerations. The vacuum insulation panels (22) are provided with beveled edges (26) or otherwise positively interfacing edges so as to overlap adjacent panels and present a more reliably insulative seam. The system (10) further includes a self-defrosting pressure equalization port (30) for automatically equalizing interior and exterior pressures.

17 Claims, 1 Drawing Sheet

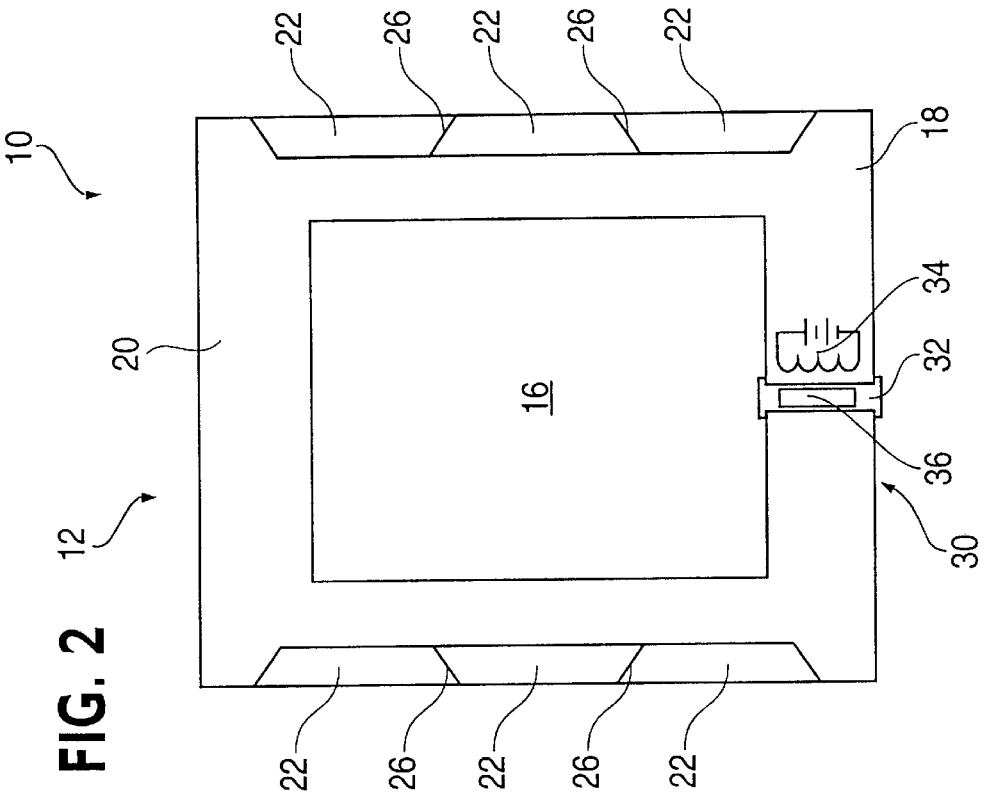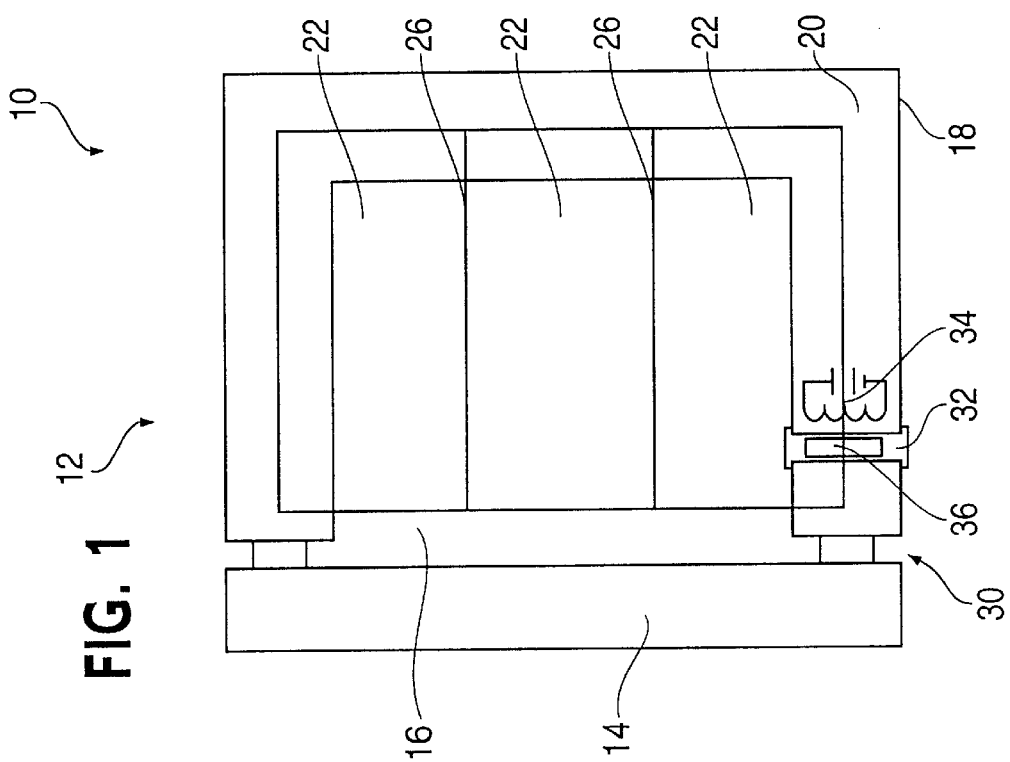

ULTRA-LOW TEMPERATURE FREEZER CABINET UTILIZING VACUUM INSULATED PANELS

BACKGROUND OF THE INVENTION

1. Field of the Invention

The present invention relates to refrigeration devices for cooling and storing material at low temperatures. More particularly, the invention relates to a low temperature refrigeration device incorporating vacuum insulation panels and a pressure equalization sub-system for ensuring reliable cold storage of materials such as perishable biological samples.

2. Description of the Prior Art

Low temperature refrigeration devices, especially ultra-low temperature freezers, are commonly used in laboratory settings for cooling and storing materials, including biological samples, between approximately −40° C. and −95° C. The ambient temperature in areas in which these devices are typically used can reach 32° C. Because of the great difference between interior and ambient temperatures, and the typically perishable and sometimes irreplaceable nature of the contents, mitigating heat transfer in order to maintain the required interior temperature is of paramount importance. Proper insulation is essential in mitigating heat transfer.

Existing insulation schemes for low temperature refrigeration devices combine thin, high-cost vacuum insulation panels (VIPs) with thick, low-cost conventional blown foam insulation to achieve a desirable balance of cost and size. Many such schemes, however, rely on a few large-sized VIPs, typically one for each side of the refrigeration device's rectangular housing. Unfortunately, this means that failure of a single VIP results in a very large area of decreased insulation and potential heat transfer. Furthermore, insulation schemes that use multiple smaller VIPs, rather than a single large VIP, typically experience increased heat transfer at imperfect seams where adjacent panels butt against one another.

Another problem with prior art insulation schemes relates to interior and exterior pressure differentials. Opening and closing the refrigeration device's door results in warm air being introduced into and trapped within the interior compartment. As the warm air cools, a lower than ambient pressure develops in the interior compartment. This pressure difference can have varied effects, including stressing the relatively weak VIPs, possibly resulting in a loss of vacuum, and making the door more difficult to subsequently open.

SUMMARY OF THE INVENTION

The refrigeration system of the present invention presents novel improvements in the art of refrigeration technology, thereby enabling more reliable and efficient cooling and low-temperature storage of materials such as biological samples. The refrigeration system strategically combines conventional, high-density, foamed-in-place urethane insulation with VIPs to economically decrease wall thickness from five inches to two inches, which allows for greater interior storage space without increasing exterior cabinet dimensions. Thus, a refrigeration unit built according to the preferred embodiment has approximately twenty percent more storage capacity than the same size 20.2 cubic-foot conventional upright device. Using numerous smaller VIPs rather than a few large VIPs mitigates the effects of panel failure, thereby localizing and minimizing undesired heat transfer. Furthermore, each insulative panel has beveled edges to overlap and positively interface with adjacent panels, which more reliably impedes heat transfer along the interface seam.

A pressure equalization port is included to equalize differences between interior and ambient pressures, which reduces this source of stress on the VIPs and thereby extends their useful life and ensures more reliable cooling and storage. Furthermore, equalizing pressures makes opening the refrigeration device's door easier. A heating element keeps the pressure equalization port frost-free, thereby helping to maintain its operation and efficiency.

These and other important aspects of the present invention are more fully described in the section below entitled DETAILED DESCRIPTION OF A PREFERRED EMBODIMENT.

BRIEF DESCRIPTION OF THE DRAWING

A preferred embodiment of the present invention is described in detail below with reference to the attached drawing figures, wherein:

FIG. 1 is a side sectional view showing the strategic placement of the various insulative materials within the simplified cabinet of a preferred embodiment of the present invention; and FIG. 2 is a front sectional view showing the strategic placement of the various insulative materials within the simplified cabinet of FIG. 1.

DETAILED DESCRIPTION OF A PREFERRED EMBODIMENT

Referring to FIGS. 1 and 2, simplified representations are shown of an ultra-low temperature freezer unit 10 which is operable to reliably, efficiently, and cost-effectively cool and store materials at temperatures between approximately −40° C. and −95° C. Such a freezer unit 10 is particularly useful in laboratories for storing perishable biological samples and materials. The freezer 10, broadly comprises an insulated housing 12 and an access door 14 that together define an interior storage compartment 16. Although illustrated and described as an upright unit, the present invention is independent of any particular storage capacity, dimensions, or orientation.

The housing 12 aids in maintaining the interior temperature of the freezer 10 and protects the contents from damage. The housing 12 is preferably multi-layered, having an exterior layer 18 of a durable protective material, such as stainless steel, cold-rolled steel, aluminum, or fiberglass, and multiple interior insulative layers 20,22. There are preferably two interior insulative layers: one layer of conventional insulation 20, such as urethane foam, and one layer of panel insulation 22, such as a vacuum insulation panel. The conventional insulation 20 is preferably expanding, foamed-in-place urethane insulation using R22 foam blowing agent. Though having a lower insulative value than the VIP insulation 22, the blown foam 20 has a correspondingly lower cost. Furthermore, because it is blown into place, the foam 20 has the advantageous ability to fill and conform to irregular surfaces presented by the exterior layer 18 and various sub-systems, including the pressure equalization port 30 described below.

The VIPs 22 provide a very high degree of insulative value for a given thickness, but are correspondingly costly and significantly structurally weaker than the blown foam 20. The preferred VIPs are relatively rigid, comprising an open-cell vacuum insulation core of polystyrene foam encapsulated by a sealed and evacuated (1.0–0.001 torr) film laminate barrier. A desiccant or getter is preferably included to absorb and trap any moisture in the core. A suitable core material is, for example, INSTILL, available from Dow Chemical Corp.; a suitable film laminate barrier is Mylar, available from DuPont, Inc.

The advantage of using both conventional foam insulation 20 and a layer of VIPs 22 is a practical and economical reduction in total insulation thickness from approximately five inches to only two inches. This space savings can be realized as either smaller exterior dimensions while maintaining the same interior storage capacity, or a larger interior storage space while maintaining the same exterior dimensions.

Multiple adjacent VIPs 22 are used to insulate larger surfaces, such as the sides and back of the housing 12. By using multiple smaller VIPs 22, rather than a single large VIP, the effects of a loss of vacuum or other VIP structural failure are minimized and localized to a much smaller area. The contacting surfaces or seam 26 of adjacent VIPs 22 presents a potential point of heat transfer and so should be positively interfaced to minimize any leakage due to separation, movement, or imperfections in the panels. Thus, the preferred panels present beveled or otherwise overlappable edges to form a positively interfaced seam 26. Alternatively, the panels 22 may present interconnectable or interlockable edges to affirmatively interface with or engage one another.

The door 14 is hingedly mounted to the housing 12 and positionable to substantially seal the interior compartment 16 when closed. For economy, the door 14 preferably comprises only a single layer of conventional, urethane foam insulation and no VIPs, unlike the housing 12. Alternatively, the door may include one or more VIPs similar to the housing 12.

The interior compartment 16 is operable to contain materials, such as biological samples, within the low temperature environment provided by the refrigeration device 10 as a whole. The interior compartment 16 is enclosably defined by the housing 12 and door 14.

In operation, the combination of conventional urethane foam 20 and VIP 22 insulation operates to mitigate heat transfer between the ambient environment and the interior compartment 16 wherein material such as biological samples are cooled and stored. Because multiple smaller VIPs 22 are used, the effects of a VIP failure are minimized, and, in particular, deleterious heat transfer is localized.

When the door 14 is opened to access the stored materials, warm ambient air is introduced into the low temperature environment of the interior compartment 16. When the door 14 is closed, the warm air is trapped within the compartment 16 and is subsequently cooled to the required temperature. Because a given quantity of warm air has a greater volume than the same quantity of cold air, the cooling warm air causes the interior compartment 16 to develop a lower pressure than the ambient environment. This pressure difference can create stress on the weak VIPs 22 as the pressure difference attempts to draw them or push them inwardly. Furthermore, the pressure difference has the same effect on the door 14, thereby making subsequent openings more difficult.

Therefore, the preferred refrigeration device 10 further comprises a pressure equalization system 30 incorporated into the housing 12 or door 14 and comprising a port 32 openable to equalize differences between the interior and exterior environment, and a defrosting heater 34 to prevent ice accumulation which could impede the port's performance. The defrosting heater 34 is preferably a conventional heating element placed so as to have the desired warming effect on the port 32. Rather than a conventional valve, the preferred port 32 uses copper wool 36 to minimize warm air infiltration into the interior compartment 16. The use of copper wool 36 has the further advantage of providing uniform defrosting, unlike a solid valve.

From the preceding description, it can be seen that the refrigeration system of the present invention is operable to reliably, efficiently, and cost-effectively cool and store materials at temperatures between approximately −40° C. and −95° C. Applications are contemplated for the refrigeration system herein described that require only minor modifications to the system as disclosed. Furthermore, the present invention is for a refrigeration device having multiple positively interfacing VIPs and a pressure equalization port, and is independent of other aspects and features associated with a refrigeration device, such as, for example, cooling mechanisms, door latches and mounting hardware, and interior dividers and other hardware. Thus, although the invention has been described with reference to the preferred embodiment illustrated in the attached drawings, it is noted that equivalents may be employed and substitutions made herein without departing from the scope of the invention as recited in the claims. For example, the housing 12 may be designed with a wide variety of exterior or interior dimensions and orientations.

Having thus described the preferred embodiment of the invention, what is claimed as new and desired to be protected by Letters Patent includes the following:

1. A refrigeration system located in an ambient environment, the refrigeration system comprising:
    a housing presenting a plurality of housing sides;
    at least one outer door, with the housing and the outer door defining at least one interior compartment substantially sealed from the ambient environment;
    a plurality of insulative panels associated with the housing sides; and
    a pressure equalization system operable to equalize a pressure difference between the interior compartment and the ambient environment,
    wherein the pressure equalization system uses copper wool to mitigate the introduction of ambient air into the interior compartment.

2. The refrigeration system of claim 1, the insulative panels being vacuum insulation panels comprising a core insulation material encapsulated in a sealed and evacuated protective material.

3. The refrigeration system of claim 1, with at least two of the insulative panels contacting one another along positively interfacing edges.

4. The refrigeration system of claim 3, the positively interfacing edges providing overlapping contact of the insulative panels.

5. The refrigeration system of claim 3, the positively interfacing edges providing interconnecting contact of the insulative panels.

6. The refrigeration system of claim 3, the positively interfacing edges providing interlocking contact of the insulative panels.

7. The refrigeration system of claim 1, the pressure equalization system further comprising a heating element operable to prevent an accumulation of ice on the pressure equalization device.

8. A refrigeration system located in an ambient environment, the refrigeration system comprising:

a housing presenting a plurality of housing sides;

at least one outer door, with the housing and the outer door defining at least one interior compartment substantially sealed from the ambient environment;

a plurality of insulative panels associated with the housing sides with at least two of the insulative panels contacting one another along positively interfacing edges; and a pressure equalization system operable to equalize a pressure difference between the interior compartment and the ambient environment, wherein the pressure equalization system uses copper wool to mitigate the introduction of ambient air into the interior compartment.

9. The refrigeration system of claim 8, the pressure equalization system further comprising a heating element operable to prevent an accumulation of ice on the pressure equalization device.

10. The refrigeration system of claim 9, the insulative panels being vacuum insulation panels comprising a core insulation material encapsulated in a sealed and evacuated protective material.

11. The refrigeration system of claim 8, the positively interfacing edges providing overlapping contact of the insulative panels.

12. The refrigeration system of claim 8, the positively interfacing edges providing interconnecting contact of the insulative panels.

13. The refrigeration system of claim 8, the positively interfacing edges providing interlocking contact of the insulative panels.

14. The refrigeration device of claim 1, wherein said door comprises a single layer of insulation.

15. The refrigeration device of claim 14, wherein said door further comprises an additional layer of insulation.

16. The refrigeration device of claim 8, wherein said panels further comprise at least two interior insulative layers.

17. The refrigeration device of claim 15, wherein said single layer and said additional layer of insulation are vacuum insulation panels.

* * * * *

UNITED STATES PATENT AND TRADEMARK OFFICE
CERTIFICATE OF CORRECTION

PATENT NO.    : 6,397,620 B1
DATED         : June 4, 2002
INVENTOR(S)   : Kelly et al.

It is certified that error appears in the above-identified patent and that said Letters Patent is hereby corrected as shown below:

<u>Title page,</u>
Item [73], please change the Assignee's location from "Charlotte, NC" to -- Muskegon, MI --.

Signed and Sealed this

Seventeenth Day of December, 2002

JAMES E. ROGAN
*Director of the United States Patent and Trademark Office*